(12) United States Patent
Lim et al.

(10) Patent No.: US 9,293,940 B2
(45) Date of Patent: Mar. 22, 2016

(54) APPARATUS AND METHOD FOR CONTROLLING CHARGING CURRENT IN DEVICE USING RECHARGEABLE BATTERY

(75) Inventors: Heui-Do Lim, Suwon-si (KR);
Jeong-Yun Hong, Suwon-si (KR);
Seung-Jun Lee, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 734 days.

(21) Appl. No.: 13/240,851

(22) Filed: Sep. 22, 2011

(65) Prior Publication Data

US 2012/0280663 A1 Nov. 8, 2012

(30) Foreign Application Priority Data

May 6, 2011 (KR) ........................ 10-2011-0042770

(51) Int. Cl.
*H02J 7/00* (2006.01)
*H02J 7/04* (2006.01)

(52) U.S. Cl.
CPC ............. *H02J 7/0081* (2013.01); *H02J 7/0083* (2013.01)

(58) Field of Classification Search
CPC ...................................................... Y02E 60/12
USPC .......................................................... 320/128
See application file for complete search history.

(56) References Cited

U.S. PATENT DOCUMENTS

| 6,275,006 | B1* | 8/2001 | Koike et al. | 320/125 |
| 2008/0309293 | A1* | 12/2008 | Kung et al. | 320/160 |
| 2009/0160407 | A1* | 6/2009 | Hwang | 320/157 |
| 2011/0037439 | A1* | 2/2011 | Bhardwaj et al. | 320/152 |
| 2011/0140664 | A1 | 6/2011 | Aradachi et al. | |
| 2014/0253023 | A1* | 9/2014 | Paryani et al. | 320/107 |

FOREIGN PATENT DOCUMENTS

JP 2003-87991 3/2003

* cited by examiner

*Primary Examiner* — Edward Tso
*Assistant Examiner* — Ahmed Omar

(57) ABSTRACT

An apparatus and a method stabilize a charging current when recharging a battery in a device that uses a rechargeable battery. The device includes a charge module and a controller. The charge module provides a charging current to the battery, and operates in at least one of a Constant Current (CC) mode that maintains the charging current at a fixed value while the battery is charged, and a Constant Voltage (CV) mode that maintains a battery voltage at a reference value. The controller controls the charge module to operate in the CC mode when starting charging, controls the charge module to operate in the CV mode when the battery voltage reaches the reference value, and controls the charge module to operate in the CC mode for at least one time duration after the battery voltage reaches the reference value.

12 Claims, 6 Drawing Sheets

APPARATUS AND METHOD FOR CONTROLLING CHARGING CURRENT IN DEVICE USING RECHARGEABLE BATTERY

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on May 6, 2011 and assigned Ser. No. 10-2011-0042770, the entire disclosure of which is hereby incorporated by reference.

TECHNICAL FIELD OF THE INVENTION

The present invention relates to a device using a rechargeable battery. More particularly, the present invention relates to an apparatus and a method for controlling a charging current in a device using a rechargeable battery.

BACKGROUND OF THE INVENTION

Mobile apparatuses that enable portability such as a mobile phone receive power through a battery. At this point, a rechargeable battery is generally used. A user should recharge the battery before the battery is discharged completely. To charge the battery, a charge module controls a current flowing from an external power source to the battery. For example, the charge module ensures a stable operation of the apparatus and protects an internal circuit by maintaining the sizes of the current and voltage from the external power source.

However, an amount of current flowing from the external power source may excessively increase due to an unexpected circumstance such as power consumption caused by the operation of the apparatus while the battery is charged. In this situation, the stable operation of the apparatus may be disturbed and damage may be generated to an external power supply unit and a charging circuit as well as an internal circuit.

Therefore, an alternative for stably maintaining an amount of a current flowing from the external power source is needed.

SUMMARY OF THE INVENTION

To address the above-discussed deficiencies of the prior art, it is a primary aspect of the present invention to provide an apparatus and a method for stably supplying a charging current in a device that uses a rechargeable battery.

Another aspect of the present invention is to provide an apparatus and a method for efficiently operating a Constant Current (CC) mode that maintains a charging current at a fixed value and a Constant Voltage (CV) mode that maintains a battery voltage at a reference value in a device that uses a rechargeable battery.

Another aspect of the present invention is to provide an apparatus and a method for controlling to operate in a CC mode for at least one time duration after entering a CV mode in a device that uses a rechargeable battery.

Another aspect of the present invention is to provide an apparatus and a method for operating a CC mode and a CV mode alternately after entering the CV mode in a device that uses a rechargeable battery.

Yet another aspect of the present invention is to provide an apparatus and a method for operating a CC mode and a CV mode simultaneously in a device that uses a rechargeable battery.

According to an aspect of the present invention, an apparatus that uses a rechargeable battery is provided. The apparatus includes a charge module and a controller. The charge module provides a charging current to the battery, and operates, while the battery is charged, in at least one of a Constant Current (CC) mode that maintains the charging current at a fixed value and a Constant Voltage (CV) mode that maintains a battery voltage at a reference value. The controller controls the charge module to operate in the CC mode when starting charging, in the CV mode when the battery voltage reaches the reference value, and in the CC mode for at least one time duration after the battery voltage reaches the reference value.

According to another aspect of the present invention, a method for charging a battery in a device that uses a rechargeable battery is provided. The device is operated in a Constant Current (CC) mode that maintains a charging current at a fixed value when starting charging. When a battery voltage reaches a reference value, the device is operated in a Constant Voltage (CV) mode that maintains the battery voltage at the reference value. The device is operated in the CC mode for at least one time duration after the battery voltage reaches the reference value.

According to yet another aspect of the present invention, and apparatus for recharging a battery is provided. The apparatus includes a charge module and a controller. The charge module provides a charging current to the battery. The controller operates the charge module in a Constant Current (CC) mode that maintains a charging current at a fixed value when the battery is initially charged, operates the charge module in a Constant Voltage (CV) mode that maintains a battery voltage at a reference value when the battery voltage substantially reaches a reference value, and operate the charge module to prevent that the charging current becomes an over current which is higher than the fixed value when the battery substantially at the reference value.

Other aspects, advantages and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Embodiments of the present invention provide a technology for stably supplying a charging current in a device that uses a rechargeable battery. In the following description, the device includes all apparatuses that use a rechargeable battery such as a cellular phone, a Personal Communication System (PCS), a Personal Digital Assistant (PDA), an International Mobile Telecommunication-2000 (IMT-2000) terminal, a lap-top computer, and such.

In the device, according to an embodiment of the present invention, a charge module may operate in a Constant Current (CC) mode and a Constant Voltage (CV) mode. The CC mode denotes a state that maintains a constant charging current. The CV mode denotes a state that maintains a constant battery voltage. A process for controlling the charging current and the battery voltage depending on the CC mode and the CV mode is described below with reference to FIG. 1.

Figure 1:
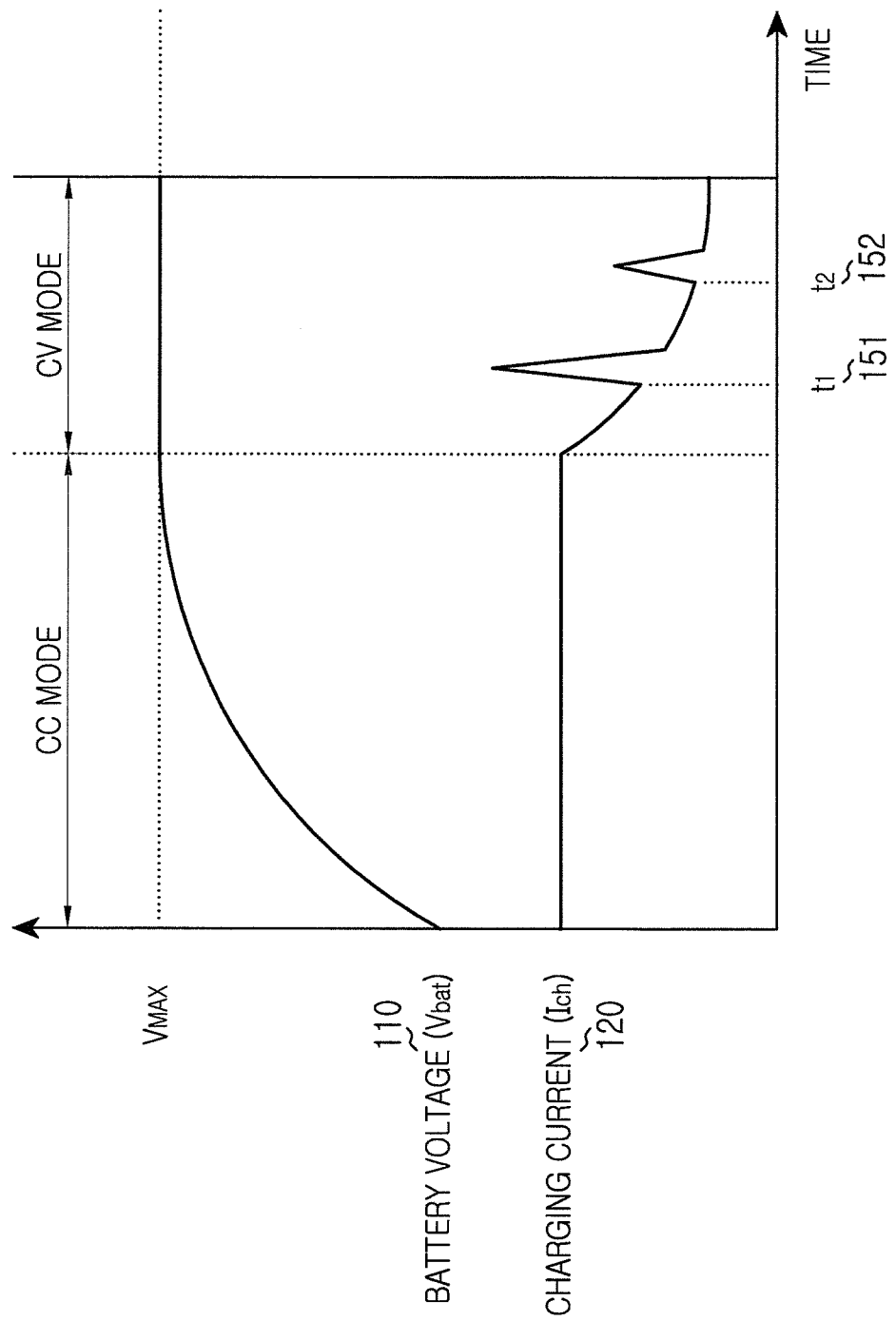
FIG. 1 is a graph illustrating a change of a battery voltage and a charging current in a device that uses a rechargeable battery.

FIG. 1 is a graph illustrating a change of a battery voltage and a charging current in a device that uses a rechargeable battery. Referring to FIG. 1, when charging initially, the charge module operates in the CC mode, and accordingly, an amount of a charging current 120 flowing from an external power source is maintained at a fixed value. As the charging current 120 of the fixed value is supplied to the battery constantly, the battery voltage 110 of the battery rises and reaches a maximum voltage $V_{MAX}$, which is a reference value. When the battery voltage reaches the maximum voltage $V_{MAX}$, the charge module switches to the CV mode. As the charge module switches to the CV mode, the battery voltage 110 is maintained at the maximum voltage $V_{MAX}$. As the battery voltage 110 maintains the constant value, the charging current 120 gradually reduces, and the battery approaches to a full charge state.

When a different module of the device, for example, a functional block such as a Central Processing Unit (CPU), a modern, and such, operates while the charge module maintains the CV mode, the functional block uses the current. Accordingly, the charge module introduces a large amount of a charging current 120 in order to maintain the battery voltage 110 at the reference value, that is, the maximum voltage $V_{MAX}$. That is, a phenomenon illustrated at a time t1 151 and a time t2 152 in FIG. 1 occurs. In other words, the charging current 120 may become unstable due to the operation of the different functional block.

Accordingly, embodiments of the present invention propose an alternative for controlling the CC mode and the CV mode in order to stabilize a charging current as follows. Embodiments of the present invention propose a control alternative of operating in the CC mode for at least one time duration after the battery voltage reaches the reference value and then enters the CV mode. In one embodiment, the CV mode and the CC mode are operated alternately. In another embodiment, the CV mode and the CC mode are operated concurrently. The embodiments are described below, respectively.

According to an embodiment, a device that uses a rechargeable battery repeatedly operates the CC mode and the CV mode. That is, the device switches to the CV mode and then controls to switch to the CC mode again depending on a charging current value. Accordingly, because a ratio of a duration in which the device operates in the CC mode increases for a time up to a full charge, introduction of an over current may be prevented. At this point, the device reaches the full charge state by lowering the fixed value of each CC mode step by step. A change of the battery voltage and the charging current according to an embodiment is illustrated in FIG. 2.

Figure 2:
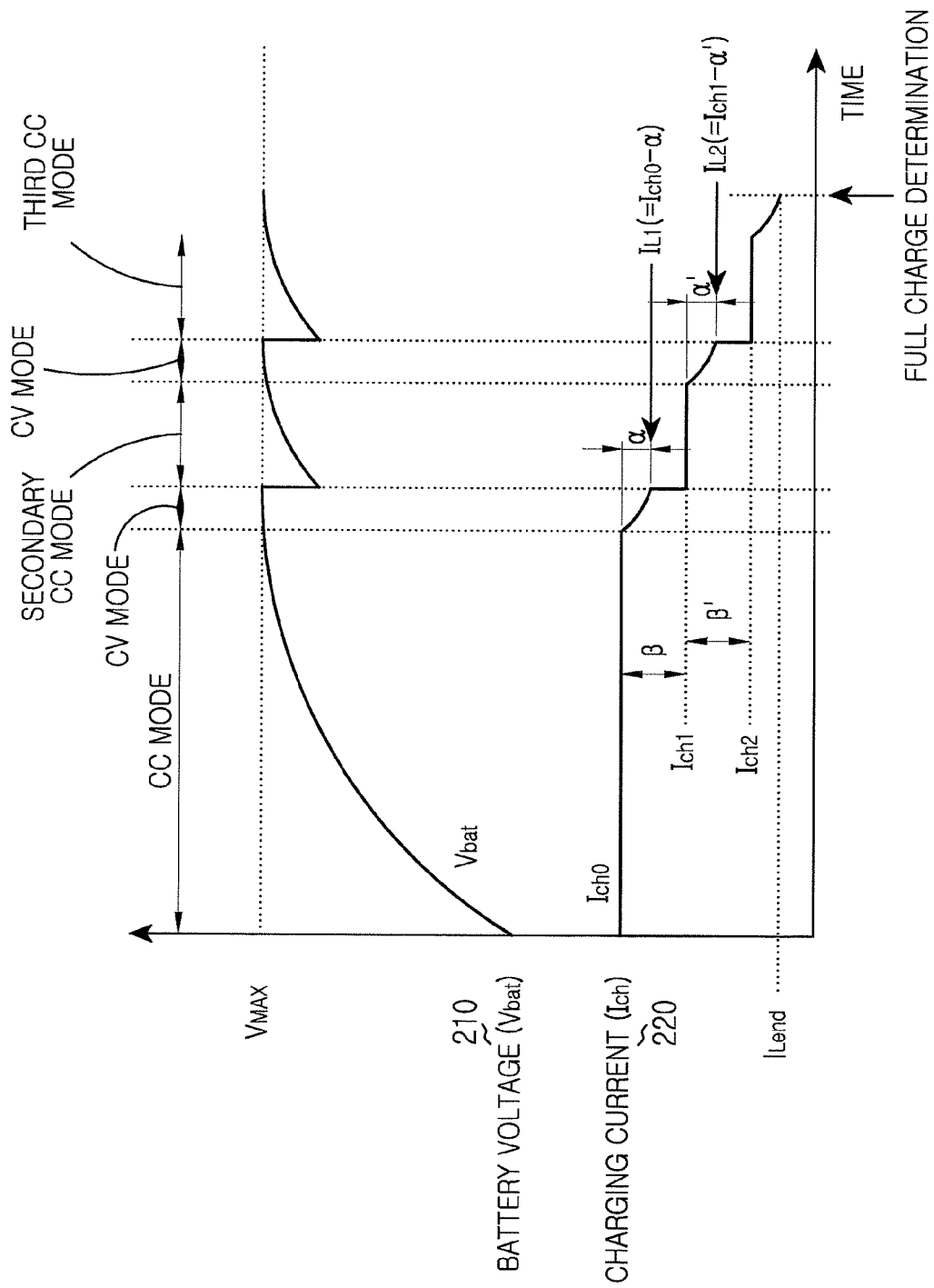
FIG. 2 is a graph illustrating a change of a battery voltage and a charging current in a device that uses a rechargeable battery according to an embodiment of the present invention.

FIG. 2 is a graph illustrating a change of a battery voltage and a charging current in a device that uses a rechargeable battery according to an embodiment of the present invention. Referring to FIG. 2, the device operates in the CC mode initially. When a battery voltage 210 reaches $V_{MAX}$, the device switches to the CV mode. Accordingly, a charging current 220 gradually reduces. When the charging current 220 reduces by a, in other words, the charging current 220 becomes $I_{L1}(=I_{ch0}-\alpha)$, the device returns to the CC mode. Here, $I_{L1}$ denotes a threshold of the charging current 220 for returning to the CC mode. Hereinafter, the threshold of the charging current 220 for returning to the CC mode is denoted by a 'mode switching threshold'. In other words, the device switches to a secondary CC mode. At this point, a current fixed value $I_{ch1}(=I_{ch0}-\beta)$ of the secondary CC mode is less than $I_{L1}$. Accordingly, the charging current 220 rapidly reduces, and a drop of the battery voltage 210 occurs.

A current as high as the $I_{ch1}$ is constantly supplied to the battery via the secondary CC mode, and accordingly, the battery voltage 210 gradually increases and reaches $V_{MAX}$ again. When the battery voltage 210 reaches $V_{MAX}$ again, the device returns to the CV mode. Accordingly, the charging current 220 gradually reduces. When the charging current 220 reduces by $\alpha'$, in other words, the charging current 220 becomes $I_{L2}(=I_{ch1}-\alpha')$, the device switches to a third CC mode. A current fixed value $I_{ch2}(=I_{ch1}-\beta')$ of the third CC mode is less than $I_{L2}$.

The above-described process is repeated until the charging current 220 reaches a reference current value $I_{Lend}$ of a full charge determination. Though two instances of re-switching to the CC mode have been illustrated in the example of FIG. 2, the number of instances of re-switching to the CC mode may change according to a specific embodiment. Additionally, in FIG. 2, $\alpha$ and $\alpha'$, which are difference values between current fixed values and mode switching thresholds in respective increments, may be equal or different. In addition, $\beta$ and β', which are amounts of change in current fixed values in respective increments, may be equal or different. It is preferable that β is greater than α, and that β' is greater than α'.

According to an embodiment of the present invention, a device that uses a rechargeable battery operates in the CC mode and the CV mode concurrently. That is, the device maintains the CC mode even when operating in the CV mode as the battery voltage reaches a predetermined value. In other words, the device operates in the CC mode and the CV mode concurrently. Accordingly, because the CC mode is not stopped until the battery reaches a full charge, introduction of an over current may be prevented. A change of a battery voltage and a charging current according to an embodiment is illustrated in FIG. 3.

Figure 3:
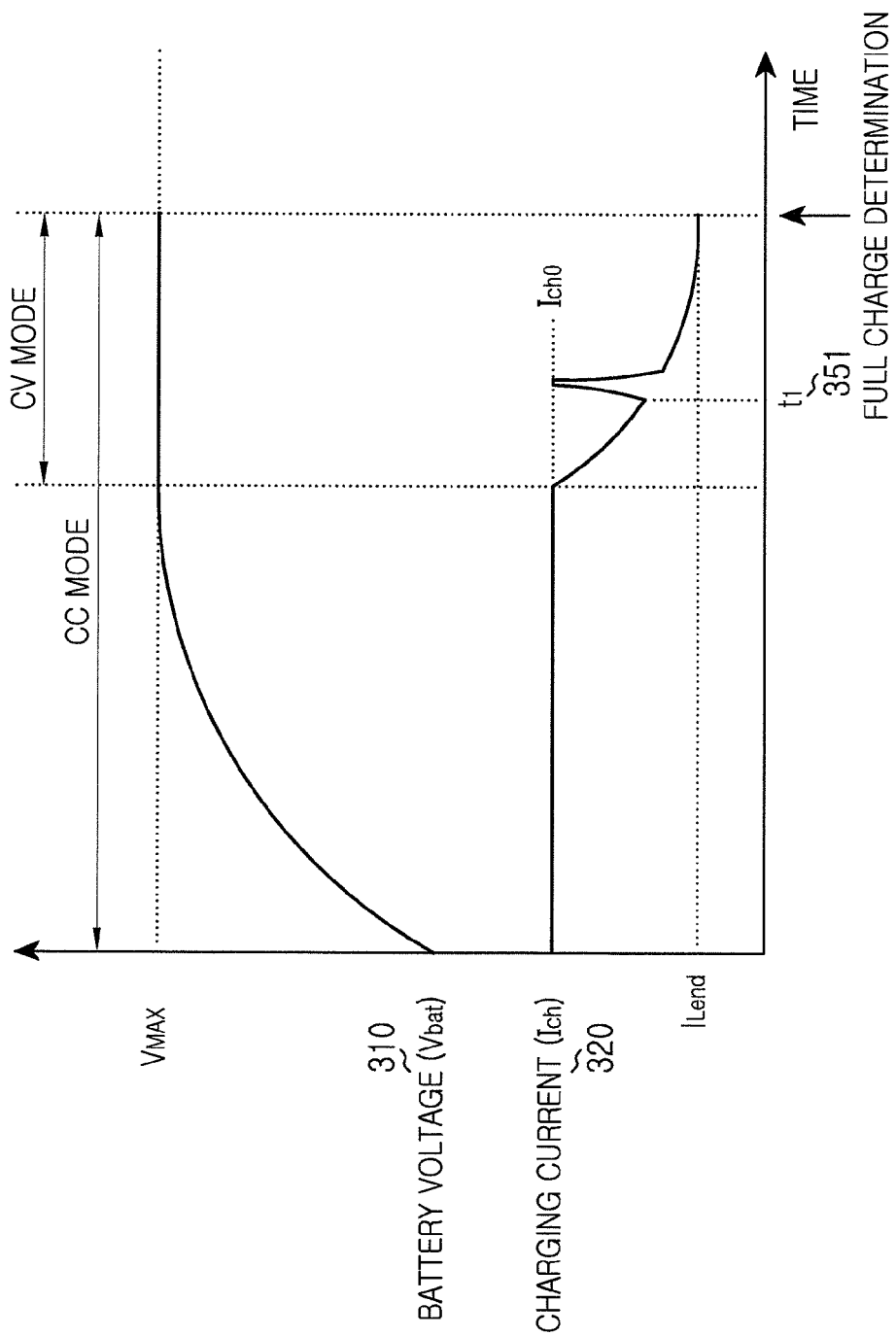
FIG. 3 is a graph illustrating a change of a battery voltage and a charging current in a device that uses a rechargeable battery according to an embodiment of the present invention.

FIG. 3 is a graph illustrating a change of a battery voltage and a charging current in a device that uses a rechargeable battery according to an embodiment of the present invention. Referring to FIG. 3, the device operates in the CC mode initially. A charging current 320 is maintained at a fixed value of $I_{ch0}$. When a battery voltage 310 reaches $V_{MAX}$, the device switches to the CV mode. Accordingly, the charging current 320 gradually reduces. At this point, the CC mode is not released. The CC mode is operated together with the CV mode. Therefore, even when a larger current is introduced due to use of a current by a different functional block according to t1 351, the charging current 320 does not exceed a current fixed value $I_{ch0}$ of the CC mode.

Hereinafter, an operation procedure and a construction of the device that controls a charging current are described in more detail with reference to the accompanying drawings.

Figure 4:
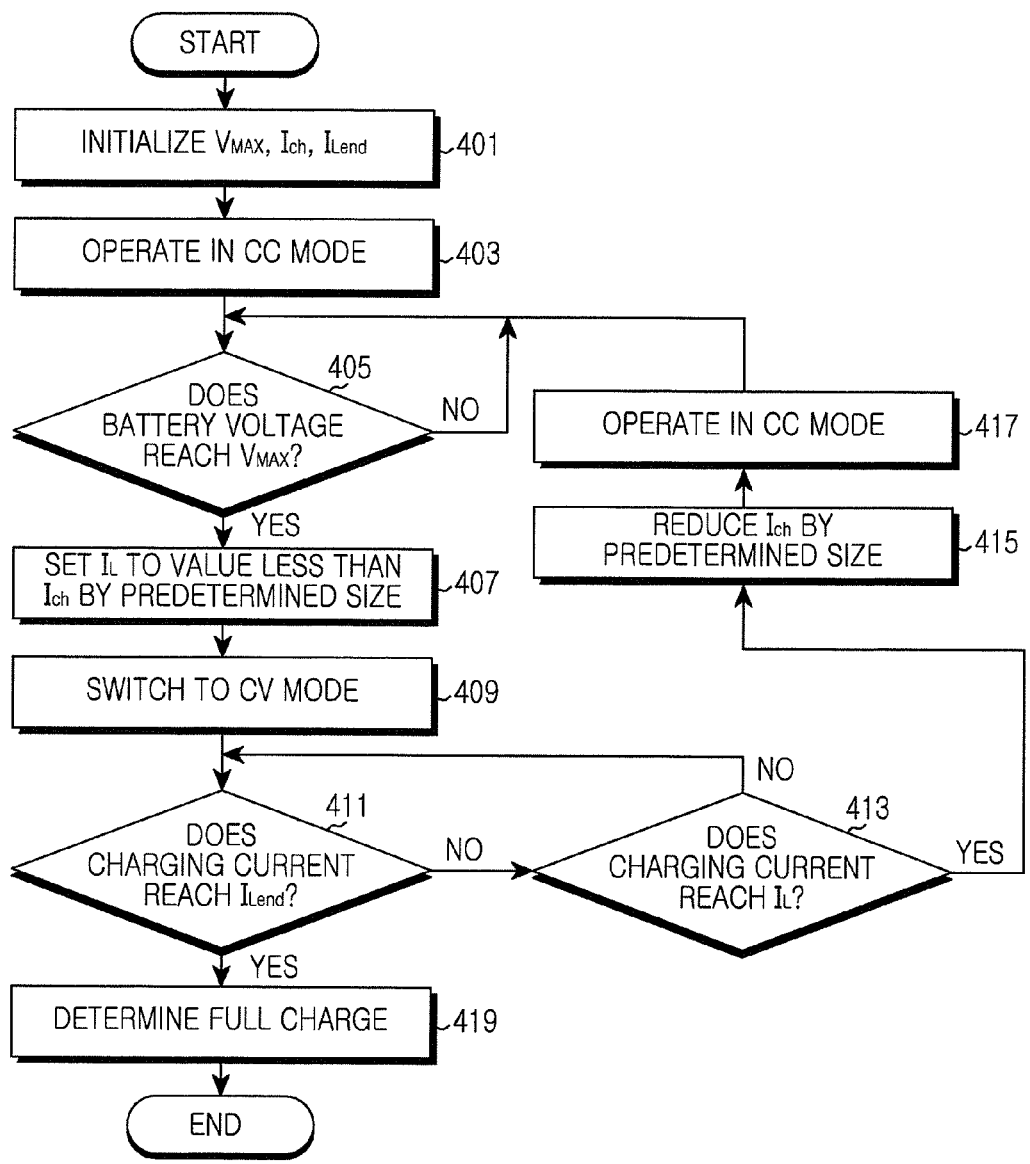
FIG. 4 illustrates a process for operating a device that uses a rechargeable battery according to an embodiment of the present invention.

FIG. 4 illustrates a process for operating a device that uses a rechargeable battery according to an embodiment of the present invention. FIG. 4 illustrates an embodiment in which the CC mode and the CV mode are operated repeatedly.

Referring to FIG. 4, the device initializes $V_{MAX}$, $I_{ch}$, and $I_{Lend}$ in step 401. $V_{MAX}$ is a maximum voltage of the battery, and a condition under which a battery voltage enters the CC mode, and a voltage value maintained in the CC mode. $I_{ch}$ is a current fixed value maintained in the CC mode. At this point, $I_{ch}$ is set to a current fixed value of an initial CC mode, for example, $I_{ch0}$ of FIG. 2. $I_{Lend}$ is a charging current value for determining a full charge.

Subsequently, the device operates in the CC mode and starts charging in step 403. Accordingly, the device monitors a charging current supplied from an external power source to the battery, and maintains the value of the charging current at $I_{ch}$.

The device determines whether a battery voltage reaches $V_{MAX}$ in step 405. That is, as the charging current is maintained at $I_{ch}$, the battery voltage gradually increases. The device monitors the battery voltage, and determines whether the battery voltage reaches $V_{MAX}$. The CC mode is maintained until the battery voltage reaches $V_{MAX}$.

When the battery voltage reaches $V_{MAX}$, the device proceeds to step 407 to set $I_L$ to a value less than $I_{ch}$. $I_L$ is a condition of the charging current for returning to the CV mode. A predetermined size, that is, a reducing amount of $I_L$ is determined in advance, and the reducing amount may be a constant that is independent of a current value $I_{ch}$, or may be a variable that changes depending on the current $I_{ch}$ value. When the reducing amount is a variable that changes depending on the current $I_{ch}$ value, the device may determine the reducing amount with reference to a look-up table defined in advance. At this point, the look-up table may define the reducing amount or directly define $I_L$.

After setting $I_L$, the device switches to the CV mode in step 409. Accordingly, the device monitors the battery voltage and maintains the value of the battery voltage at $V_{MAX}$.

The device determines whether the charging current reaches $I_{Lend}$ in step 411. When the charging current does not reach $I_{Lend}$, the device proceeds to step 413 to determine whether the charging current reaches $I_L$. When $I_L$ is greater than $I_{Lend}$, the determination of step 413 will occur first.

When the charging current reaches $I_L$, the device proceeds to step 415 to reduce $I_{ch}$ by a predetermined size. At this point, $I_{ch}$ which has been reduced by the predetermined size is less than $I_L$.

After reducing $I_{ch}$, the device switches to the CC mode in step 417. In other words, the device enters the CC mode which uses the reduced $I_{ch}$ as a current fixed value. Accordingly, the device monitors the charging current supplied from the external power source to the battery, and maintains the value of the charging current at $I_{ch}$. In addition, the device returns to step 405.

After that, the device repeatedly performs steps 405 to 417 until the charging current reaches $I_{Lend}$. When the charging current reaches $I_{Lend}$ in step 411, the device proceeds to step 419 to determine a full charge of the battery.

Figure 5:
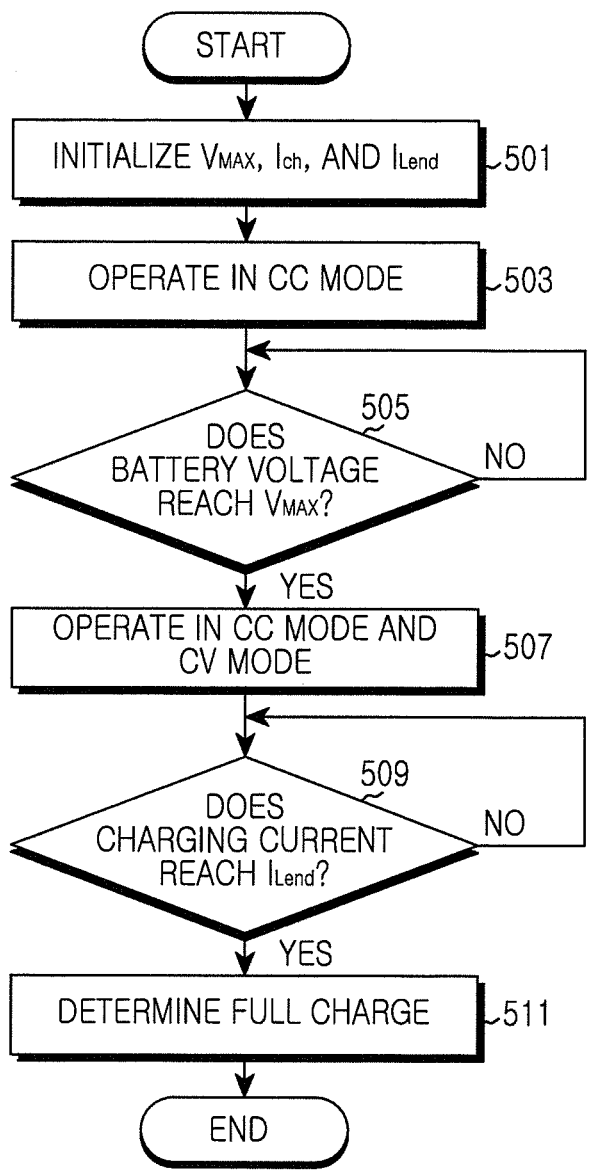
FIG. 5 illustrates a process for operating a device that uses a rechargeable battery according to an embodiment of the present invention.

FIG. 5 illustrates a process for operating a device that uses a rechargeable battery according to an embodiment of the present invention.

Referring to FIG. 5, the device initializes $V_{MAX}$, $I_{ch}$, and $I_{Lend}$ in step 501. $V_{MAX}$ is a maximum voltage of the battery, is a condition of a battery voltage for entering the CC mode, and is a voltage value maintained in the CC mode is a current fixed value maintained in the CC mode. At this point, $I_{ch}$ is set to a current fixed value of an initial CC mode, for example, $I_{ch0}$ of FIG. 2. $I_{Lend}$ is a charging current value for determining a full charge.

Subsequently, the device operates in the CC mode and starts charging in step 503. Accordingly, the device monitors a charging current supplied from an external power source to the battery, and maintains the value of the charging current at $I_{ch}$.

After that, the device determines whether a battery voltage reaches $V_{MAX}$ in step 505. That is, as the charging current is maintained at $I_{ch}$, the battery voltage gradually increases. The device monitors the battery voltage and determines whether the battery voltage reaches $V_{MAX}$. The CC mode is maintained until the battery voltage reaches $V_{MAX}$.

When the battery voltage reaches $V_{MAX}$, the device proceeds to step 507 to operate in the CV mode while maintaining the CC mode. Accordingly, the device maintains the value of the charging current at $I_{ch}$ and concurrently maintains the value of the battery voltage at $V_{MAX}$. That is, a charge module provided to the device has a structure that can operate the CC mode and the CV mode concurrently.

The device determines whether the charging current reaches $I_{Lend}$ in step 511. Until the charging current reaches $I_{Lend}$, the CC mode and the CV mode are maintained. When the charging current reaches $I_{Lend}$, the device proceeds to step 511 to determine the full charge of the battery.

Figure 6:
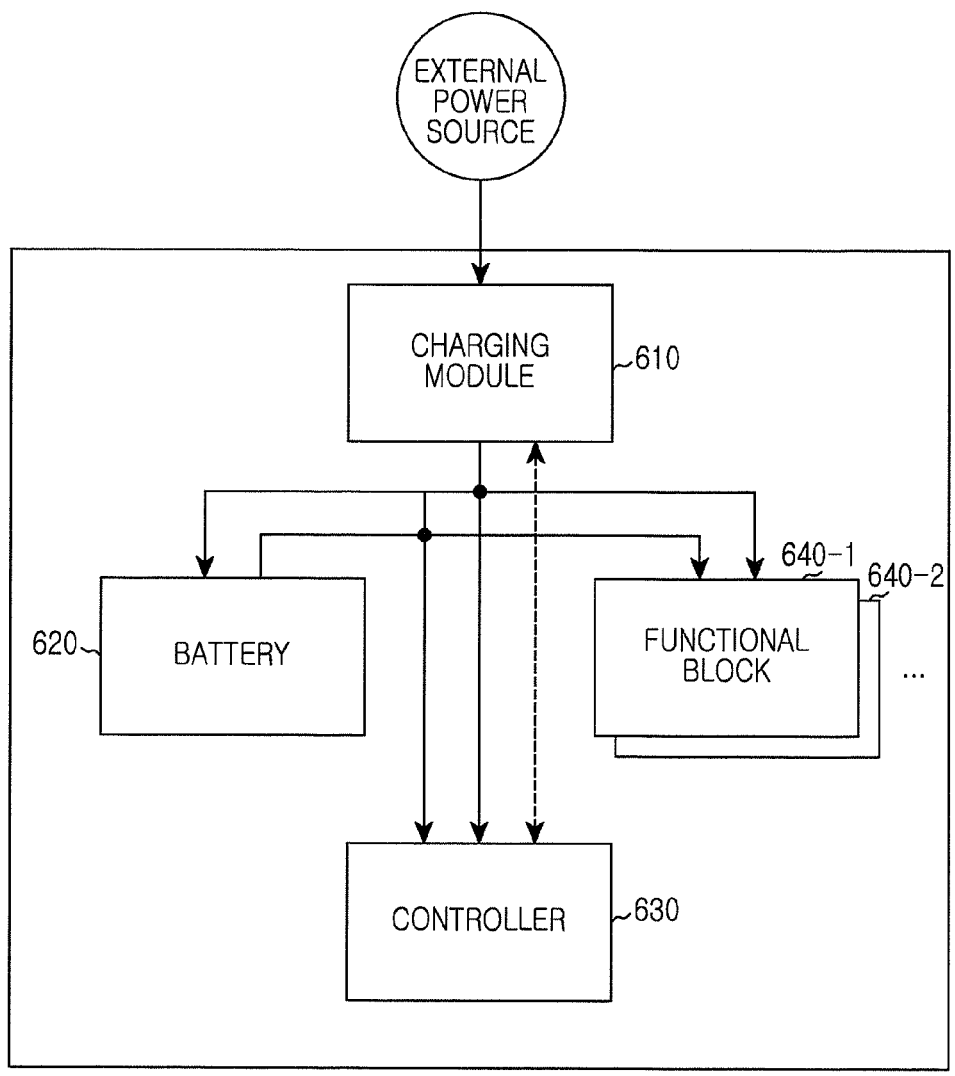
FIG. 6 is a block diagram of a device that uses a rechargeable battery according to an embodiment of the present invention.

FIG. 6 is a block diagram of a device that uses a rechargeable battery according to an embodiment of the present invention.

Referring to FIG. 6, the device includes a charge module 610, a battery 620, a controller 630, and at least one functional block 640.

The charge module 610 controls a current from an external power source and provides the current to the battery 620, the controller 630, and the at least one functional block 640. That is, the charge module 610 provides a charging current to the battery 620. At this point, while charging the battery 620, the charge module 610 operates in at least one of the CC mode that maintains the charging current at a fixed value and the CV mode that maintains the battery voltage at a reference value. While charging the battery 620, the charge module 610 monitors the charging current flowing through the battery and the battery voltage applied to the battery, and reports the charging current and values of the battery voltage to the controller 630.

When the battery 620 is not connected to the external power source, the battery 620 provides a current for the operations of the controller 630 and the at least one functional block 640. The battery 620 is rechargeable and is charged by accumulating a charging current provided from the charge module 610.

The controller 630 controls overall functions of the device. More particularly, the controller 630 receives values of the charging current and the battery voltage from the charge module 610, and determines the operation state of the charge module 610 based on the values of the charging current and the battery voltage. That is, the controller 630 controls the charge module 610 to operate in at least one of the CC mode and the CV mode.

The at least one functional block 640 serves as an element that consumes power of the device. For example, the at least one functional block 640 includes a modem, a Digital Signal Processor (DSP), a display unit, and such. The controller 630 may be included in the functional block 640.

The operations of the controller 630 and the charge module 610 according to an embodiment of the present invention are described below. The controller 630 initializes $V_{MAX}$ which is a maximum voltage of the battery, $I_{ch}$ which is a current fixed value maintained in the CC mode, and $I_{Lend}$ which is a charging current value for determining a full charge. When starting charging initially, the controller 630 controls the charge module 610 to operate in the CC mode, and the charge module 610 maintains the value of the charging current at $I_{ch}$. After that, when the battery voltage reaches $V_{MAX}$, the controller 630 proceeds to block 407 to set $I_L$ which is a condition of the charging current for returning to the CV mode to a value smaller than $I_{ch}$ by a predetermined size. A reducing amount of $I_L$ is determined in advance, and the reducing amount may be a constant that is independent of a current $I_{ch}$ value, or may be a variable that changes depending on the current $I_{ch}$ value. In addition, the controller 630 controls the charge module 610 to switch to the CV mode, and the charge module 610 maintains the value of the battery voltage at $V_{MAX}$. After that, when the charging current reaches $I_L$, the controller 630 reduces $I_{ch}$ by a predetermined size, and controls the charge module 610 to enter the CC mode that uses the reduced $I_{ch}$ as a current fixed value. Accordingly, the charge module 610 maintains the value of the charging current at the reduced $I_{ch}$. Until the charging current reaches $I_{Lend}$, the controller repeats the CC mode and the CV mode as described above. In addition, when the charging current reaches $I_{Lend}$, the controller 630 determines the full charge of the battery 620.

The operations of the controller 630 and the charge module 610 according to an embodiment of the present invention are described below. The controller 630 initializes $V_{MAX}$ which is a maximum voltage of a battery, $I_{ch}$ which is a current fixed value maintained in the CC mode, and $I_{Lend}$ which is a charging current value for determining a full charge. When starting charging initially, the controller 630 controls the charge module 610 to operate in the CC mode, and the charge module 610 maintains the value of the charging current at $I_{ch}$. After that, when the battery voltage reaches $V_{MAX}$, the controller 630 controls the charge module 610 to operate in the CV mode while maintaining the CC mode. Accordingly, the charge module 610 maintains the value of the charging current at $I_{ch}$ and concurrently maintains the value of the battery voltage at $V_{MAX}$. That is, the charge module 610 has a structure that can operate the CC mode and the CV mode concurrently. After that, when the charging current reaches $I_{Lend}$, the controller 630 determines the full charge of the battery 620.

Embodiments of the present invention may prevent a charging current from increasing excessively by operating the CC mode for at least one time duration after a battery voltage reaches a reference value, that is, a maximum voltage and a device that uses a rechargeable battery enters the CV mode.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus that uses a rechargeable battery, the apparatus comprising:
   a charge module configured to
      provide a charging current to the battery; and
   a controller configured to:
      operate the charge module in a first Constant Current (CC) mode that maintains a charging current at a fixed value such that a voltage of the battery increases to a reference value;
      operate, when the battery voltage reaches the reference value, the charge module in a first Constant Voltage (CV) mode that maintains the battery voltage at the reference value such that the charging current decreased from the fixed value to a first value;
      reduce, when the charging current reaches the first value, the fixed value by a predetermined first amount;
      operate the charge module in a second CC mode that maintains the charging current at the reduced fixed value such that the battery voltage increases to the reference value; and
      operate, when the battery voltage re-reaches the reference value, the charge module in a second CV mode that maintains the battery voltage at the reference value such that the charging current decreases from the fixed value to a second value.

2. The apparatus of claim 1, wherein the controller is further configured to:
   reduce, when the charging current reaches the second value, the reduced fixed value by a predetermined second amount; and
   operate the charge module in a third CC mode that maintains the charging current at the re-reduced fixed value such that the battery voltage increases to the reference value.

3. The apparatus of claim 1, wherein the predetermined value is determined depending on the fixed value.

4. The apparatus of claim 1, wherein the predetermined value is determined as a fixed constant.

5. The apparatus of claim 1, wherein the predetermined amount is determined depending on the fixed value.

6. The apparatus of claim 1, wherein the predetermined amount is determined as a fixed constant.

7. A method for charging a battery in a device that uses the rechargeable battery, the method comprising:

operating a battery charger in a first Constant Current (CC) mode that maintains a charging current at a fixed value such a battery voltage increases to a reference value;

when the battery voltage reaches the reference value, operating the battery charger in a first Constant Voltage (CV) mode that maintains the battery voltage at the reference value such the charging current decreased from the fixed value to a first value;

when the charging current reaches the first value, reducing the fixed value by a predetermined first amount;

operating the battery charger in a second CC mode that maintains the charging current at the reduced fixed value such the battery voltage increases to the reference value; and when the battery voltage re-reaches the reference value, operating the battery charger in a second CV mode that maintains the battery voltage at the reference value such that the charging current decreases from the reduced fixed value to a second value.

8. The method of claim 7, further comprising:

when the charging current reaches the second value, reducing the reduced fixed value by a predetermined second amount; and operating the battery charger in a third CC mode that maintains the charging current at the re-reduced fixed value such that the battery voltage increases to the reference value.

9. The method of claim 7, wherein the predetermined value is determined depending on the fixed value.

10. The method of claim 7, wherein the predetermined value is determined as a fixed constant.

11. The method of claim 7, wherein the predetermined amount is determined depending on the fixed value.

12. The method of claim 7, wherein the predetermined amount is determined as a fixed constant.

* * * * *